United States Patent
Michels

(10) Patent No.: US 10,095,749 B2
(45) Date of Patent: Oct. 9, 2018

(54) RELEVANCE-WEIGHTED AND RANKED RESULT SETS

(71) Applicant: SAP SE, Walldorf (DE)

(72) Inventor: Frank Michels, Speyer (DE)

(73) Assignee: SAP SE, Walldorf (DE)

( * ) Notice: Subject to any disclaimer, the term of this patent is extended or adjusted under 35 U.S.C. 154(b) by 416 days.

(21) Appl. No.: 14/754,090

(22) Filed: Jun. 29, 2015

(65) Prior Publication Data

US 2016/0378764 A1    Dec. 29, 2016

(51) Int. Cl.
  *G06F 7/00* (2006.01)
  *G06F 17/30* (2006.01)
(52) U.S. Cl.
  CPC .... *G06F 17/3053* (2013.01); *G06F 17/30528* (2013.01)
(58) Field of Classification Search
  CPC ................ G06F 17/3053; G06F 17/30528
  USPC .................................................. 707/713
  See application file for complete search history.

(56) References Cited

U.S. PATENT DOCUMENTS

| | | | | |
|---|---|---|---|---|
| 2009/0006358 | A1* | 1/2009 | Morris | G06F 17/30672 |
| 2009/0144262 | A1* | 6/2009 | White | G06F 17/30389 |
| 2013/0198174 | A1* | 8/2013 | Poznanski | G06F 17/30867 |
| | | | | 707/723 |
| 2013/0311455 | A1* | 11/2013 | Kritt | G06F 17/30867 |
| | | | | 707/723 |

* cited by examiner

*Primary Examiner* — Van Oberly
(74) *Attorney, Agent, or Firm* — Fish & Richardson P.C.

(57) ABSTRACT

The disclosure generally describes methods, software, and systems, including a method for generating search results. A search query for querying information from an information source, including business objects, is received from a user. Features associated with the user and business objects are identified for which result items are to be boosted using business knowledge associated with the user and information source. For each identified feature, query terms in the received search query applicable to a particular feature are identified. Weights based on the business knowledge are identified for feature-value pairs associated with each query term. A weighted search query is generated that includes weighted query parts that are a function of a respective query term and associated weight. The weighted search query is executed to produce a ranked result set that includes result items ranked according to the weights. The ranked result set is provided.

17 Claims, 4 Drawing Sheets

RELEVANCE-WEIGHTED AND RANKED RESULT SETS

BACKGROUND

The present disclosure relates to the execution of queries.

As data used in systems and applications becomes increasingly important, users may want to execute a search on the data using a search command. For example, users can generate and execute search queries to identify data that meets specific conditions or requirements, such as through the use of a structured query language (SQL) statement or some other command. Other types of queries can include, for example, pre-defined reports that execute queries in order to identify data for inclusion in the reports. Un In some instances, the data searched in a query can include, for example, data in one or more databases, flat files, knowledge bases, data warehouses, and/or other data sources and structures. The data can be stored locally or can be available remotely, e.g., accessed over the Internet. Users can be members of various groups or departments, or may have specific roles within an organization or in association with a system. The use of data from the results of a query can be business-related, of personal nature, and/or for some other reason.

SUMMARY

The disclosure generally describes computer-implemented methods, software, and systems for the execution of queries and providing result sets. For example, a search query for querying information from an information source, including business objects, is received from a user. Features associated with the user and business objects are identified for which result items in result sets are to be boosted using business knowledge associated with the user and with the information source. For each identified feature, query terms in the received search query that are applicable to a particular feature are identified. Weights are identified for feature-value pairs associated with each query term, each weight based on business knowledge associated with the user and information source. A weighted search query is generated that includes weighted query parts that are a function of a respective query term and associated weight. The weighted search query is executed to produce a ranked result set that includes result items ranked according to the weights. The ranked result set includes identical, but ranked, result entries otherwise produced by executing the received search query. The ranked result set is provided in response to the received search query.

The present disclosure relates to computer-implemented methods, software, and systems for generating executable components. One computer-implemented method includes: receiving a search query from a user, the search query querying information from an information source including business objects; identifying features associated with the user and/or the business objects and for which result sets are to include boosting of result items based on business knowledge associated with the user and the information source; identifying, for each identified feature, query terms in the received search query to which a particular feature applies; for each identified query term to which a particular feature applies, identifying a weight for one or more feature-value pairs associated with the query term, each weight based on the business knowledge associated with the user and the information source, the business knowledge used to identify one or more feature-value pairs to which the weight is applicable; generating a weighted search query that includes weighted query parts, each weighted query part being a function of a respective query term and an associated weight; executing the weighted search query to produce a ranked result set that includes result items ranked according to the weights, the ranked result set including identical, but ranked, result entries that would be produced by executing the received search query; and providing the ranked result set in response to the received search query.

The foregoing and other implementations can each optionally include one or more of the following features, alone or in combination. In particular, one implementation can include all the following features:

In a first aspect, combinable with any of the previous aspects, a respective feature-value pair identifies a feature corresponding to a user identifier, a user group, a user role, a department, an organization, a product, a service, a location, or a date-time.

In a second aspect, combinable with any of the previous aspects, the respective feature-value pair identifies a value that is a constant, a range, a string, or a set.

In a third aspect, combinable with any of the previous aspects, a respective weighted query part includes a conditional relationship between a respective feature and a respective value, the conditional relationship being equality, inequality, greater than, less than, Boolean, set inclusion, intersection, union, or any combinations thereof.

In a fourth aspect, combinable with any of the previous aspects, the weighted search query is a re-written version of the received search query, the weighted search query including: in-terms having high weights and including selection criteria matching a respective query term and including the values of the one or more feature-value pairs, the in-terms boosting ranks of corresponding result items in the ranked result set according to the weights associated with the one or more feature-value pairs; and out-terms having low weights and including selection criteria matching a respective query term and excluding the values of the one or more feature-value pairs, the out-terms not affecting ranks of corresponding result items in the ranked result set.

In a fifth aspect, combinable with any of the previous aspects, the method further includes annotating entries in the ranked result set to indicate boosted entries.

In a sixth aspect, combinable with any of the previous aspects, method further includes annotating the entries includes marking information in entries with highlighting or bolding.

In a seventh aspect, combinable with any of the previous aspects, the method further includes receiving information indicating how feature-value pairs are to be weighted on a per-user, per-group, and/or per-data-record basis; processing the received information including creating weights; and storing the weights in association with the business knowledge associated with the user.

In an eighth aspect, combinable with any of the previous aspects, the method further includes using lower weights for generating result items ranked lower than result items associated with in-terms and out-terms, the lower weights based on business knowledge associated with the user and the information source.

The subject matter described in this specification can be implemented in particular implementations so as to realize one or more of the following advantages. Users can be provided automatically with a meaningful relevance-ranking of the result results, e.g., without having to provide specific inputs to affect the ranking.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
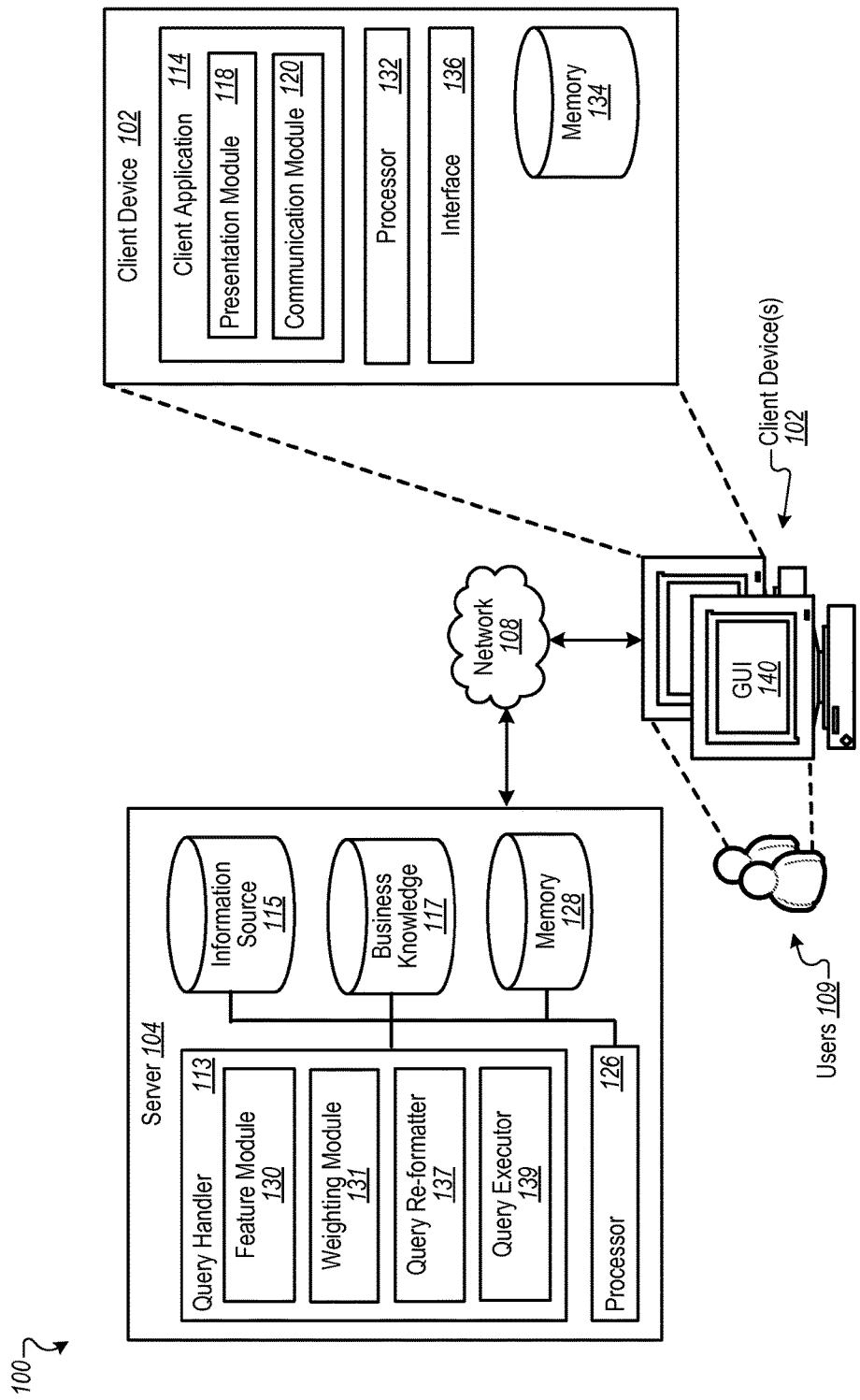
FIG. 1 is a block diagram of an example environment for executing queries and providing result sets according to an implementation.

This disclosure generally describes computer-implemented methods, software, and systems for re-writing a search query to weight query results based on business knowledge. For example, a search query can be received from a user for querying information from an information source that includes business objects. Features associated with the user and business objects can be identified from which associated search result items are boosted using business knowledge associated with the user and information source. For each identified feature, query terms in the received search query applicable to a particular feature can be identified. Weights based on the business knowledge can be identified for feature-value pairs associated with each query term. A weighted search query can be generated that includes weighted query parts that are a function of a respective query term and associated weight. The weighted search query can be executed to produce a ranked result set that includes result items ranked according to the weights. The ranked result set can be provided.

In some implementations, the following actions can occur. A browser-like search command including one or multiple terms (e.g., "current sales") can be provided by the user. A search can be executed, such as against a single business object (e.g., Products). The business object can be, for example, a database-view on one or more underlying tables in a database, such as associated with an application. Using metadata, relevant attributes/columns associated with the search command can be fetched. A search query can be constructed by testing all search-terms against the relevant attributes/columns, such as to create a SQL-like statement:

SELECT <search-result> FROM Products WHERE . . . , ORDER BY score DESC

To make the search results more relevant to the user, weights can be assigned to various columns. For example, columns associated with the search can be assigned with a ranking weight (e.g., Low, Medium and High) reflecting the relevance of the column for the business object. Ranking rules can be used, for example, so that hits (e.g., results) in high-ranked columns have corresponding high-rank scores for a particular single result item in the result set. For example, depending on the hit constellation, a score is calculated per result item. Additionally, features such as text-ranking (RF-IDF) and fuzzy-ranking can also be included on a column-wise basis. As a result, result items fitting the search query and meeting user-associated weights are ranked the highest. This is an improvement over typical systems in which relevance ranking only takes into account, for example, the query and/or the data/metadata of the business object.

Further, to make result sets even more relevant to a user, for example, certain knowledge associated with the user and/or certain predefined business knowledge associated with the data can be used to influence the ranking of the result set to a the user's needs. For example, it may be known that the user is assigned to the work area "Sales" (or in a sales-related group or role). Using this knowledge, relevance ranking can be used to boost the rank of sales-related products. For example, all products that are categorized in area "Sales" can be boosted, e.g., as shown in the following pseudo SQL fragment:

. . . WHERE workArea="Sales"

In another example of making result sets more relevant to a user, the SQL can be modified to boost objects that the user has touched most frequently in the last week. For example, consider the following pseudo SQL fragment (e.g., in which objectKey="4711" is used to indicate the previous week):

. . . WHERE objectKey="4711"

In some implementations, various techniques can be used to seamlessly integrate value boosting with the original ranking, so that a low score due to the first can be increased by the second and visa-versa. In some implementations, significance factors (e.g., normalized to 1.0) can be used. For example, in order to boost a result item by a certain significance, the following pseudo SQL fragments can be used:

. . . WHERE workArea="Sales" [Significance=70%]
. . . WHERE objectKey="4711" [Significance=50%]

While the two pseudo SQL fragments are useful for identifying result sets to be boosted, they cannot be used alone to limit the result sets, as result items that are less important to the user may be omitted altogether. Simply adding the boost condition to the search is not possible. Instead, all result items are to be retained, and the order of the result items is to be changed based on the ranking.

In some implementations, to solve the problem of introducing the significance factors, weights can be added to query conditions, including adding higher weights to inclusion terms and lower weights to exclusion terms. All of the weights, for example, can enable the value boosting itself, and further can be used to adjust significances between the boost conditions. For example, the following pseudo SQL fragments can be used:

```
SELECT <search-result> FROM Products WHERE ... AND
(workArea = "Sales" [weight = 0.7] OR workArea !=
"Sales" [weight = 0.1] ) AND
(objectKey = "4711" [weight = 0.5] OR objectKey !=
"4711" [weight = 0.1] )
```

The pseudo SQL includes an out-condition:

'workArea!="Sales" [weight=0.1]' for including non-Sales result entries but with a lower rank. The pseudo SQL includes an in-condition 'workArea="Sales" [weight=0.7]' for including Sales result entries with a higher rank. In some implementations, general patterns can be used for use in boosting conditions. For example, for result items that are to be boosted, an in-condition can be constructed that is equal to the boost condition, with a weight equal to the significance. To construct an out-condition, default low weights can be used.

In some implementations, null values can be considered by the OUT condition too, such as in:

---
(workArea = "Sales" [weight = 0.7] OR
workArea != "Sales" [weight = 0.1] OR
workArea is NULL [weight = 0.1])
---

Using weighting, for example, the search result is not modified in the number of items, but in the order (e.g., ranking) of items. Additionally, this weighting can naturally integrate with other types of ranking (e.g., an original ranking), because the weights can be internally balanced against the weights of the freestyle-columns used in the original ranking.

Using weights in query conditions provides for query extensions that not only retain the result set as unchanged in number but also change the ranking of items in the search result, e.g., by boosting result entries having desired values in feature-value pairs. Multiple value boosts can be accomplished, for example, using multiple query extensions combined with AND. In this way, it is possible to use knowledge about a user into query search results ranking by applying a value boost based on properties known about the user.

FIG. 1 is a block diagram of an example environment 100 for executing queries and providing result sets according to an implementation. The illustrated environment 100 includes, or is communicably coupled with, plural client devices 102, and a server 104, all connected using a network 108. For example, the environment 100 can be used to provide access, for users 109 of the plural client devices 102, to applications provided by the server 104. The users 109, for example, can use the client device 102 to access the server 104 (e.g., using a portal) and the applications provided by the server 104.

At a high level, the server 104 comprises an electronic computing device operable to store and provide access to applications for use by the client device 102. An information source 115, for example, can include data for one or more business objects, among other information. A data set of business knowledge 117 can include information about users and business objects that is to be used for affecting the order of a result set. The information source 115 and business knowledge 117 can include databases that are stored or distributed in plural locations, e.g., at the client device 102, at the server 104, and/or other locations.

As used in the present disclosure, the term "computer" is intended to encompass any suitable processing device. For example, although FIG. 1 illustrates a single server 104, the environment 100 can be implemented using two or more servers 104, as well as computers other than servers, including a server pool. In some implementations, components of the server 104 may be distributed in different locations and coupled using the network 108.

In some implementations, the server 104 includes a query handler 113 that can handle requests received from the client device 102. Specifically, the query handler 113 can process requests (e.g., search queries) received from the client application 114. In some implementations, the server 104 and the query handler 113 are located apart, e.g., distributed at multiple sites and connected using the network.

The server 104 further includes a processor 126 and memory 128. Although illustrated as the single processor 126 in FIG. 1, two or more processors 126 may be used according to particular needs, desires, or particular implementations of the environment 100. Each processor 126 may be a central processing unit (CPU), an application specific integrated circuit (ASIC), a field-programmable gate array (FPGA), or another suitable component. Generally, the processor 126 executes instructions and manipulates data to perform the operations of the client device 102. Specifically, the processor 126 executes the functionality required to receive and process requests from the client device 102.

The memory 128 or multiple memories 128 may include any type of memory or database module and may take the form of volatile and/or non-volatile memory including, without limitation, magnetic media, optical media, random access memory (RAM), read-only memory (ROM), removable media, or any other suitable local or remote memory component. The memory 128 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 104. In some implementations, memory 128 includes one or more of the information source 115 (described above). Other components within the memory 128 are possible.

Each client device 102 of the environment 100 may be any computing device operable to connect to, or communicate with, at least the server 104 via the network 108 using a wire-line or wireless connection. In general, the client device 102 comprises an electronic computer device operable to receive, transmit, process, and store any appropriate data associated with the environment 100 of FIG. 1.

A query handler 113, can handle requests received from the client device 102. Specifically, the query handler 113 can process requests (e.g., search queries) received from the client application 114 (or its components 118-120). For example, a presentation module 118 can handle user interface aspects of applications that are accessed through the server 104. A communication module 120 can handle communication between the client application 114 and the server 104, for example.

A feature module 130, e.g., included in the query handler 113, can identify features that are associated with the user and/or the business objects and for which result sets are to include boosting of result items based on business knowledge 117 associated with the user and the information source.

A weighting module 131, for example, can assign weights to be used in association with the feature-value pairs. The weights to be used can be defined in the business knowledge 117 or some other source. Different weights can be assigned, e.g., depending on specific combinations of feature-pairs, so as to generate ranked query results that are of higher relevance to users.

A query re-formatter 137 can re-format a received search query to produce a weighted search query. For example, the weighted search query that is produced can include weighting terms that are set, for example, for subsequent ranking of search items matching feature-value pairs higher than search items not matching the feature-value pairs.

A query executor 139 can execute a weighted search query to produce ranked query results. For example, upon execution of the weighted search query, the order of ranked query results can depend on different types of terms that include weight annotations (e.g., [weight=x.y]) that affect a ranking after the query is executed.

The illustrated client device 102 further includes a processor 132, a memory 134, and an interface 136. The interface 136 is used by the client device 102 for communicating with other systems in a distributed environment—including within the environment 100—connected to the network 108, e.g., the server 104, as well as other systems communicably coupled to the network 108 (not illustrated). Generally, the interface 136 comprises logic encoded in software and/or hardware in a suitable combination and operable to communicate with the network 108. More specifically, the interface 136 may comprise software supporting one or more communication protocols associated with communications such that the network 108 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, JAVA, Visual Basic, Assembler, PERL, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 102 includes the processor 132. Although illustrated as the single processor 132 in FIG. 1, two or more processors 132 may be used according to particular needs, desires, or particular implementations of the environment 100. Each processor 132 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 132 executes the functionality required to send requests to the server 104 and to receive and process responses from the server 104.

The illustrated client device 102 also includes a memory 134, or multiple memories 134. The memory 134 may include any memory or database module and may take the form of volatile or non-volatile memory including, without limitation, magnetic media, optical media, random access memory (RAM), read-only memory (ROM), removable media, or any other suitable local or remote memory component. The memory 134 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 102.

The illustrated client device 102 is intended to encompass any computing device such as a smart phone, tablet computing device, PDA, desktop computer, laptop/notebook computer, wireless data port, one or more processors within these devices, or any other suitable processing device. For example, the client device 102 may comprise a computer that includes an input device, such as a keypad, touch screen, or other device that can accept user information, and an output device that conveys information associated with the operation of the server 104 or the client device 102 itself, including digital data, visual information, or a graphical user interface (GUI) 140, as shown with respect to and included by the client device 102. The GUI 140 interfaces with at least a portion of the environment 100 for any suitable purpose, including generating user interface screens for generating search queries and viewing the results. Further, the GUI 140 may be used to view and navigate various web pages located both internally and externally to the server 104.

Figure 2A:
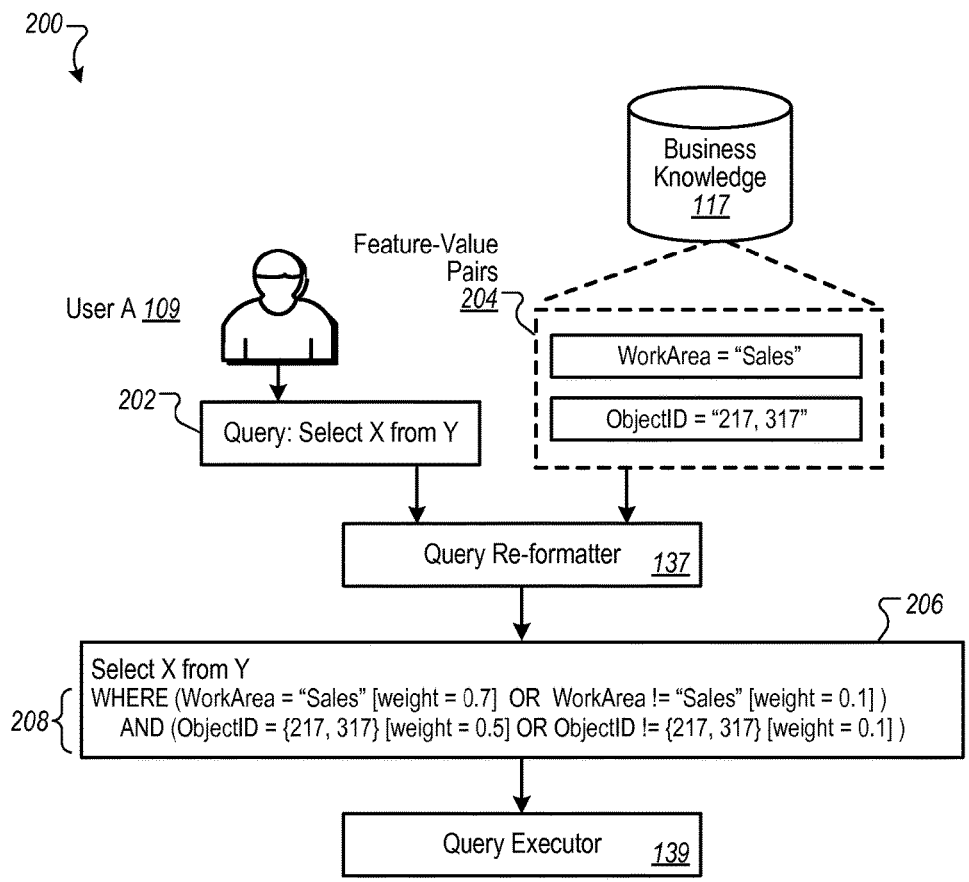
FIG. 2A is a diagram of an example scenario for re-formatting a search query to rank search results based on business knowledge according to an implementation.

FIG. 2A is a diagram of an example scenario 200 for re-formatting a search query to rank search results based on business knowledge according to an implementation. For example, a search query 202 entered by the user 109 may include search criteria, e.g., "Select X from Y" or some other search criteria. The search criteria in this example can also include conditional expressions, such as "Select X from Y WHERE <Condition>." However, regardless of whether conditions are provided, the server 104 can still create terms for use in a re-written query to include terms associated with feature-value pairs in order to rank the search results by relevance. The search query 202 can be received, for example, by the server 104 for processing by the query handler 113.

Business knowledge 117 is also used for use in ranking search results by relevance, for example. Depending on which user 109 issues the query and the business object(s) implicated by the search query 202, for example, the feature module 130 can determine feature-value pairs 204 that apply to the search query 202. The feature-value pairs can be determined independent of any original query terms that may exist in the search query 202. For example, the feature-value pairs 204 can be based entirely on the business knowledge 117 for the user and business object(s) identified upon receipt of the search query 202.

The query re-formatter 137 can re-format the received search query 202, e.g., to produce the weighted search query 206, including weighting terms 208. For example, the weighted search query 206 includes applicable portions of the search query 202 (e.g., "Select X from Y.") in addition to in-terms and out-terms, among other inclusionary language (e.g., "WHERE ... OR ... ") or syntax that holds the weighting terms 208 together. The other inclusionary language, for example, allows result entries matching the in-terms to be identified and boosted with a high-value weight while also including result entries matching the out-terms (e.g., using low-value weights). Once the weighted search query 206 is produced, the weighted search query 206 can be executed by the query executor 139, e.g., to provide ranked query results 210r as illustrated in FIG. 2B.

Figure 2B:
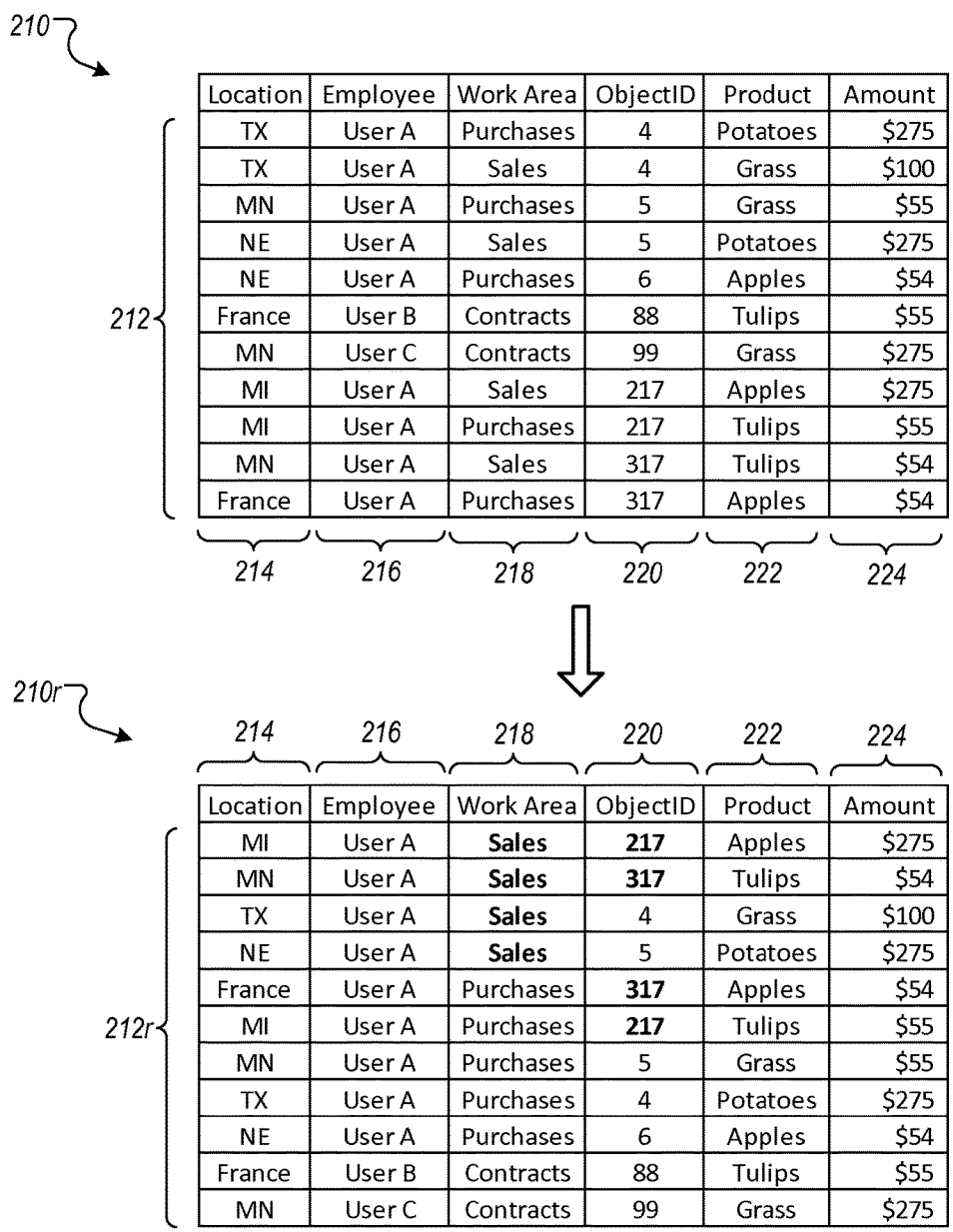
FIG. 2B illustrates unranked and ranked example query results according to an implementation.

FIG. 2B illustrates unranked and ranked example query results according to an implementation. Ranked query results 210r contain the same entries as query results 210, except that the order of the ranked result items 212r is different from result items 212. For example, the query results 210 provide one example order of the search results, e.g., if the search query 202 were executed as-is without weights assigned for feature-value pairs. The difference in order between the ranked result items 212r and the result items 212 is caused by the weights in the weighted search query 206, which causes entries associated with feature-value pairs 204 (e.g., WorkArea="Sales" and ObjectID="217, 317") to be ranked higher. For example, the first six result items 212r appear at the top of the result set, as columns 218 and 220 are effectively weighted, forcing the corresponding result items to appear first. Values of columns 214, 216, 222 and 224 do not affect the ranking.

Figure 3:
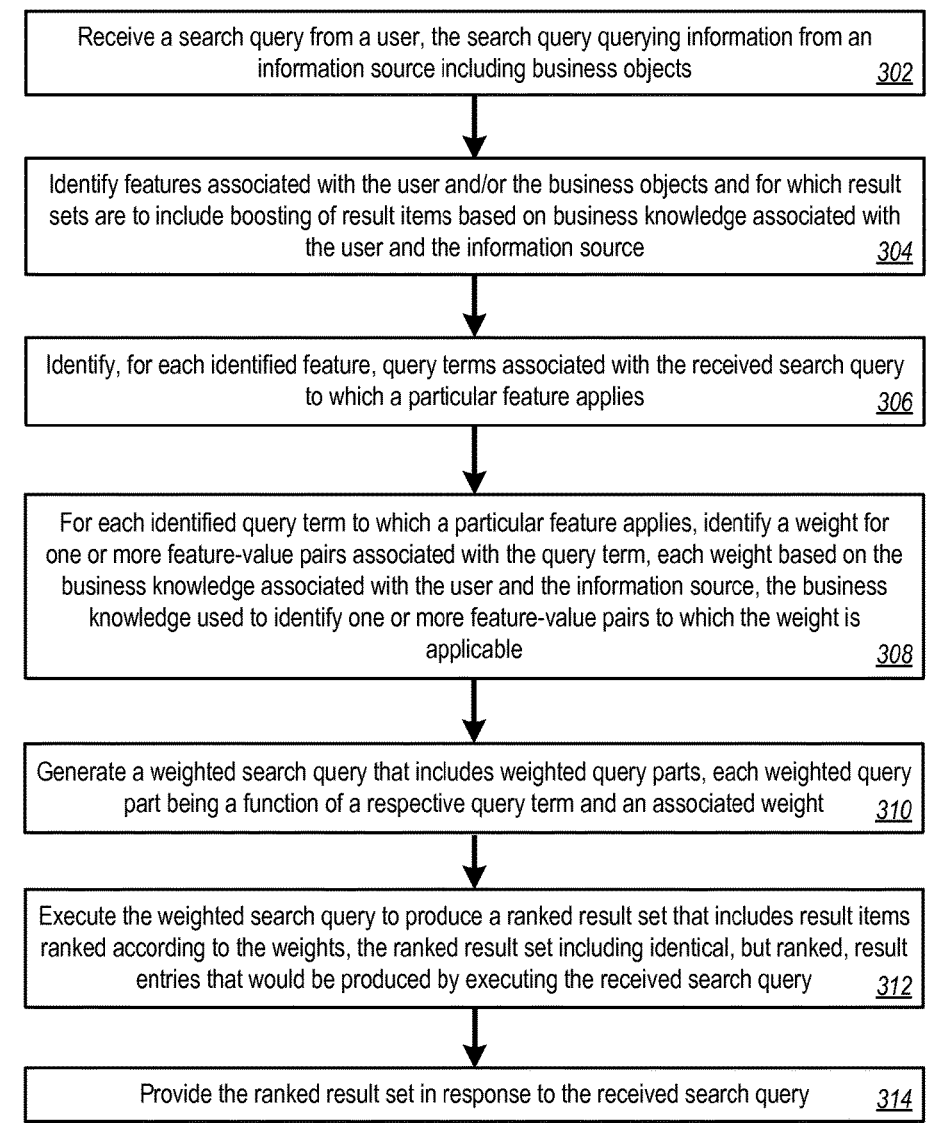
FIG. 3 is a flowchart of an example method for ranking query results based on business knowledge according to an implementation.

FIG. 3 is a flowchart of an example method 300 for ranking query results based on business knowledge. For clarity of presentation, the description that follows generally describes method 300 in the context of FIGS. 1-2B. However, it will be understood that the method 300 may be performed, for example, by any other suitable system, environment, software, and hardware, or a combination of systems, environments, software, and hardware as appropriate. In some implementations, the server 104 and/or its components can be used to execute the method 300.

At 302, a search query is received from a user, the search query for querying information from an information source including business objects. For example, the server 104 can receive the search query 202 from the client device 102. The search query 202 can be entered, for example, by the user 109 in order to query the information source 115, e.g., to obtain information regarding one or more business objects. The query handler 113 can handle the search query once received at the server 104.

At 304, features are identified that are associated with the user and/or the business objects and for which result sets are to include boosting of result items based on business knowledge 117 associated with the user and the information source. For example, using information identifying the user and based on the business object implicated in the search query, the feature module 130 can identify features (e.g., WorkArea and ObjectID). The features that are identified can include features for which query results, if generated for the user in a search query for the implicated business objects, are to be ordered (e.g., ranks) using weights associated with feature-value pairs 204 (e.g., WorkArea="Sales" and ObjectID="217, 317").

At 306, for each identified feature, query terms associated with the received search query to which a particular feature applies are identified. For example, the feature module 130 can use information associated with the identified features in combination with information in the business knowledge 117 (for the user and implicated business objects) to identify which query terms associated with the received search query are to be used weighting search results. In this example, the query terms that are identified need not be terms in the original search query (e.g., part of "Select X from Y"). Instead, the query terms that are identified and produced at this time are created specifically to cause the query results for "Select X from Y" to be ranked using business knowledge associated with the user and business objects. For example, user-specified conditions in "Select X from Y" may have nothing to do with values of WorkArea and ObjectID.

At 308, for each identified query term to which a particular feature applies, a weight is identified for one or more feature-value pairs associated with the query term. Each weight is based on the business knowledge associated with the user and the information source. The business knowledge is used to identify one or more feature-value pairs to which the weight is applicable. The weighting module 131, for example, can assign weights to be used in association with the feature-value pairs 204. The weights to be used can be defined in the business knowledge 117 or some other source. A weight of 0.7, for example, can be designated (e.g., using business knowledge) as the weight to be used when ranking result items based on feature-pairs associated with WorkArea (e.g., used in in-terms for WorkArea). A weight of 0.5, for example, can be designated (e.g., using business knowledge) as the weight to be used when ranking result items based on feature-pairs associated with ObjectID (e.g., used in in-terms for ObjectID). Other high values are possible instead of the weights 0.7 and 0.5. A weight of 0.1 (or some other low value) can be used in the out-terms for each of WorkArea and ObjectID.

In some implementations, a respective feature-value pair identifies a feature corresponding to a user identifier, a user group, a user role, a department, an organization, a product, a service, a location, or a date-time. For example, the feature-value pair WorkArea="Sales" can indicate a value of WorkArea for which search results are to be boosted, e.g., based on business knowledge that the user is in a sales-related group or position. In another example, the feature-value pair ObjectID="217, 317" can indicate two values of ObjectID for which search results are to be boosted, e.g., based on data for associated business objects being more timely (e.g., worked on in the last week). Example products can include product names, such as Example_S shoes, or Example_C cameras. Example services can include any services that can be offered by an entity or business, such as delivery, cleaning, construction, to name a few examples. Example locations can include geographic locations (e.g., latitude/longitude coordinates), elevations, proper names/titles of locations, addresses, or any other descriptor of a location. Date-times can include dates without times, dates with times, times alone (e.g., without dates), and periods of time. Elements of date-times can be measured, for example, in years, months, days, hours, minutes, seconds, or other unit(s) of time.

In some implementations, a respective feature-value pair identifies a value that is a constant, a range, a string, or a set. For example, the value part of feature-value pairs can be a single numeric item (e.g., an integer or a non-integer constant), a single character, a character string, a range of values (e.g., defined by closed or open-ended conditions, such as less than 100, greater than or equal to 50, or 1.0<n<2.0), a set (e.g., IN {Monday, Tuesday, Wednesday}, or some other value(s)).

In some implementations, a respective weighted query part includes a conditional relationship between a respective feature and a respective value, the conditional relationship being equality, inequality, greater than, less than, Boolean, set inclusion, intersection, union, or combinations thereof. For example, the weighted query part ObjectID={217, 317} [weight=0.5] OR ObjectID!={217, 317} [weight=0.1] includes equality, a Boolean OR, and a NOT equal.

At 310, a weighted search query is generated that includes weighted query parts, each weighted query part being a function of a respective query term and an associated weight. The query re-formatter 137 can reformat the received search query 202 (e.g., "Select X from Y") to produce the weighted search query 206, including the weighting terms 208.

In some implementations, the weighted search query is a re-written version of the received search query, and the weighted search query includes in-terms and out-terms. In-terms, for example, have high weights and include selection criteria matching a respective query term and including the values of the one or more feature-value pairs, the in-terms boosting ranks of corresponding result items in the ranked result set according to the weights associated with the one or more feature-value pairs. Out-terms, for example, have low weights and include selection criteria matching a respective query term and excluding the values of the one or more feature-value pairs, the out-terms not affecting ranks of corresponding result items in the ranked result set. For example, the weighted search query 206 is re-written by the query re-formatter 137 based on the received search query 202. The weighting terms 208 include an in-term 'WorkArea="Sales" [weight=0.7]' and an out-term 'WorkArea!="Sales" [weight=0.1]' for the feature WorkArea. The weighting terms 208 also include an in-term 'ObjectID={217, 317} [weight=0.5]' and an out-term 'ObjectID!={217, 317} [weight=0.1]' for the feature ObjectID.

In some implementations, the method 300 further includes annotating entries in the ranked result set to indicate boosted entries. For example, search results returned to the client device 102 can include annotating information so that, when presented to the user, entries that are boosted (e.g., according to WorkArea="Sales" or ObjectID="217, 317") appear differently, e.g., highlighting the values responsible for the boosting.

At 312, the weighted search query is executed to produce a ranked result set that includes result items ranked according to the weights, the ranked result set including identical, but ranked, result entries that would be produced by executing the received search query. The query executor 139 can execute the weighted search query 206, e.g., producing the ranked query results 210r, as described above. For example, in-terms and out-terms include weight annotations [weight=x.y] for use by the query executor 139 in ranking the results after the query is executed.

At 314, the ranked result set is provided in response to the received search query. As an example, the query handler 113 can provide the ranked query results 210r to the client device 102.

In some implementations, the method 300 further includes annotating entries in the ranked result set to indicate boosted entries. For example, entries that match the in-terms can be marked so that the entries, when presented to the user, can include highlighting or bolding.

In some implementations, the method 300 further includes receiving information indicating how feature-value pairs are to be weighted on a per-user, per-group, and/or per-data-record basis, processing the received information including creating weights, and storing the weights in association with the business knowledge associated with the user. For example, using the client device 102 or some other user device, an administrator in control of business knowledge and associated information can set up weights that are to be used by the server 104. The weights can specify, for example, that users in a particular group are to have their search results boosted whenever entries associated with that group are provided to the user, regardless of whether sales-group-related terms exist in a user-entered search query. Other weights can be specified for other business reasons, such as user-related reasons, based on values in data records (e.g., most active and/or recent information, independent of users or their groups), or in other ways.

In some implementations, the method 300 further includes using lower weights for generating result items ranked lower than result items associated with in-terms and out-terms, the lower weights based on business knowledge associated with the user and the information source. For example, data that is of relatively low importance to a user can have weights assigned that are lower than the out-term weights (e.g., 0.1) described above. For archived, deleted, cleared or otherwise less important data, weights of 0.01, for example, can be used to demote result items toward the bottom of the search results.

In some implementations, other types of boosting and demoting are possible, such as by using various weights (e.g., defined by an administrator) and available business knowledge to control the ranking of search results. In some implementations, users can elect to turn off the boosting or toggle between ranked results and non-ranked results. Other user options for reviewing and controlling the display of search results are possible.

In some implementations, components of the environments and systems described above may be any computer or processing device such as, for example, a blade server, general-purpose personal computer (PC), MACINTOSH, workstation, UNIX-based workstation, or any other suitable device. In other words, the present disclosure contemplates computers other than general purpose computers, as well as computers without conventional operating systems. Further, components may be adapted to execute any operating system, including LINUX, UNIX, WINDOWS, MAC OS, JAVA, ANDROID, IOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
   receiving a search query from a user, the search query querying information from an information source including business objects;
   identifying features associated with the user and/or the business objects and for which result sets are to include boosting of result items based on business knowledge associated with the user and the information source;
   identifying, for each identified feature, query terms in the received search query to which a particular feature applies;
   for each identified query term to which a particular feature applies, adding a significance factor to the identified query term to boost a result item by a particular significance, identifying a weight for one or more feature-value pairs associated with the query term, each weight based on the business knowledge associated with the user and the information source, the business knowledge used to identify one or more feature-value pairs to which the weight is applicable, and using the weights to adjust the effect of significance factors;
   generating a weighted search query that includes weighted query parts, each weighted query part being a function of a respective query term and an associated weight, wherein the weighted search query is a re-written version of the received search query, the weighted search query including:
      in-terms having high weights and including selection criteria matching a respective query term and including the values of the one or more feature-value pairs, the in-terms boosting ranks of corresponding result items in the ranked result set according to the weights associated with the one or more feature-value pairs; and
      out-terms having low weights and including selection criteria matching a respective query term and excluding the values of the one or more feature-value pairs, the out-terms not affecting ranks of corresponding result items in the ranked result set;
   executing the weighted search query to produce a ranked result set that includes result items ranked according to the weights, the ranked result set including identical, but ranked, result entries that would be produced by executing the received search query; and
   providing the ranked result set in response to the received search query.

2. The method of claim 1, wherein a respective feature-value pair identifies a feature corresponding to a user identifier, a user group, a user role, a department, an organization, a product, a service, a location, or a date-time.

3. The method of claim 1, wherein the respective feature-value pair identifies a value that is a constant, a range, a string, or a set.

4. The method of claim 1, wherein a respective weighted query part includes a conditional relationship between a respective feature and a respective value, the conditional relationship being equality, inequality, greater than, less than, Boolean, set inclusion, intersection, union, or combinations thereof.

5. The method of claim 1, further comprising:
   annotating entries in the ranked result set to indicate boosted entries.

6. The method of claim 5, wherein annotating the entries includes marking information in entries with highlighting or bolding.

7. The method of claim 1, further comprising:
   receiving information indicating how feature-value pairs are to be weighted on a per-user, per-group, and/or per-data-record basis;
   processing the received information including creating weights; and
   storing the weights in association with the business knowledge associated with the user.

8. The method of claim 1, further comprising using lower weights for generating result items ranked lower than result items associated with in-terms and out-terms, the lower weights based on business knowledge associated with the user and the information source.

9. A system comprising:
   memory storing:
      an information source;
      business knowledge comprising information about users and business objects comprising; and
      an application for:
         receiving a search query from a user, the search query querying information from the information source;
         identifying features associated with the user and/or the business objects and for which result sets are to include boosting of result items based on business knowledge associated with the user and the information source;
         identifying, for each identified feature, query terms in the received search query to which a particular feature applies;
         for each identified query term to which a particular feature applies, adding a significance factor to the identified query term to boost a result item by a particular significance, identifying a weight for one or more feature-value pairs associated with the query term, each weight based on the business knowledge associated with the user and the information source, the business knowledge used to identify one or more feature-value pairs to which the weight is applicable, and using the weights to adjust the effect of significance factors;

generating a weighted search query that includes weighted query parts, each weighted query part being a function of a respective query term and an associated weight, wherein the weighted search query is a re-written version of the received search query, the weighted search query including:

in-terms having high weights and including selection criteria matching a respective query term and including the values of the one or more feature-value pairs, the in-terms boosting ranks of corresponding result items in the ranked result set according to the weights associated with the one or more feature-value pairs; and out-terms having low weights and including selection criteria matching a respective query term and excluding the values of the one or more feature-value pairs, the out-terms not affecting ranks of corresponding result items in the ranked result set;

executing the weighted search query to produce a ranked result set that includes result items ranked according to the weights, the ranked result set including identical, but ranked, result entries that would be produced by executing the received search query; and providing the ranked result set in response to the received search query.

10. The system of claim 9, wherein a respective feature-value pair identifies a feature corresponding to a user identifier, a user group, a user role, a department, an organization, a product, a service, a location, or a date-time.

11. The system of claim 9, wherein the respective feature-value pair identifies a value that is a constant, a range, a string, or a set.

12. The system of claim 9, wherein a respective weighted query part includes a conditional relationship between a respective feature and a respective value, the conditional relationship being equality, inequality, greater than, less than, Boolean, set inclusion, intersection, union, or any combinations thereof.

13. The system of claim 9, wherein annotating the entries includes marking information in entries with highlighting or bolding.

14. A non-transitory computer-readable media encoded with a computer program, the program comprising instructions that when executed by one or more computers cause the one or more computers to perform operations comprising:

receiving a search query from a user, the search query querying information from an information source including business objects;

identifying features associated with the user and/or the business objects and for which result sets are to include boosting of result items based on business knowledge associated with the user and the information source;

identifying, for each identified feature, query terms in the received search query to which a particular feature applies;

for each identified query term to which a particular feature applies, adding a significance factor to the identified query term to boost a result item by a particular significance, identifying a weight for one or more feature-value pairs associated with the query term, each weight based on the business knowledge associated with the user and the information source, the business knowledge used to identify one or more feature-value pairs to which the weight is applicable, and using the weights to adjust the effect of significance factors;

generating a weighted search query that includes weighted query parts, each weighted query part being a function of a respective query term and an associated weight, wherein the weighted search query is a re-written version of the received search query, the weighted search query including:

in-terms having high weights and including selection criteria matching a respective query term and including the values of the one or more feature-value pairs, the in-terms boosting ranks of corresponding result items in the ranked result set according to the weights associated with the one or more feature-value pairs; and out-terms having low weights and including selection criteria matching a respective query term and excluding the values of the one or more feature-value pairs, the out-terms not affecting ranks of corresponding result items in the ranked result set;

executing the weighted search query to produce a ranked result set that includes result items ranked according to the weights, the ranked result set including identical, but ranked, result entries that would be produced by executing the received search query; and providing the ranked result set in response to the received search query.

15. The non-transitory computer-readable media of claim 14, wherein a respective feature-value pair identifies a feature corresponding to a user identifier, a user group, a user role, a department, an organization, a product, a service, a location, or a date-time.

16. The non-transitory computer-readable media of claim 14, wherein the respective feature-value pair identifies a value that is a constant, a range, a string, or a set.

17. The non-transitory computer-readable media of claim 14, wherein a respective weighted query part includes a conditional relationship between a respective feature and a respective value, the conditional relationship being equality, inequality, greater than, less than, Boolean, set inclusion, intersection, union, or any combinations thereof.

* * * * *